US006707200B2

(12) United States Patent
Carroll et al.

(10) Patent No.: US 6,707,200 B2
(45) Date of Patent: Mar. 16, 2004

(54) INTEGRATED MAGNETIC BEARING

(75) Inventors: David Carroll, Strafford, NH (US); James Sedgewick, York, ME (US)

(73) Assignee: Airex Corporation, Dover, NH (US)

( * ) Notice: Subject to any disclaimer, the term of this patent is extended or adjusted under 35 U.S.C. 154(b) by 0 days.

(21) Appl. No.: 09/990,838

(22) Filed: Nov. 14, 2001

(65) Prior Publication Data

US 2002/0105241 A1 Aug. 8, 2002

Related U.S. Application Data

(60) Provisional application No. 60/248,464, filed on Nov. 14, 2000.

(51) Int. Cl.[7] ................................................. H02K 7/09
(52) U.S. Cl. ..................................................... 310/90.5
(58) Field of Search ......................... 310/90.5; 318/721, 318/254

(56) References Cited

U.S. PATENT DOCUMENTS

| | | | | | |
|---|---|---|---|---|---|
| 4,841,204 | A | * | 6/1989 | Studer | 318/254 |
| 5,160,877 | A | * | 11/1992 | Fujiwara et al. | 318/568 |
| 5,237,229 | A | * | 8/1993 | Ohishi | 310/90.5 |
| 5,864,197 | A | * | 1/1999 | Naito et al. | 310/261 |
| 6,020,665 | A | * | 2/2000 | Maurio et al. | 310/90.5 |
| 6,034,456 | A | | 3/2000 | Osama et al. | 310/90.5 |
| 6,114,788 | A | | 9/2000 | Vuillemin et al. | 310/90.5 |
| 6,166,469 | A | | 12/2000 | Osama et al. | 310/90.5 |
| 6,191,513 | B1 | * | 2/2001 | Chen et al. | 310/90 |
| 6,304,015 | B1 | | 10/2001 | Filatov et al. | 310/90.5 |
| 6,320,290 | B1 | * | 11/2001 | Kanebako et al. | 310/90.5 |

* cited by examiner

Primary Examiner—Thanh Lam
(74) Attorney, Agent, or Firm—Grossman Tucker Perreault & Pfleger, PLLC (57) ABSTRACT

The present invention provides a rotational magnetic gimbal with an integral magnetic bearing. Brushless DC motor technology provides electromagnetic suspension, using a single electromagnetic actuator to perform both the radial bearing and rotary torque (motoring) functions. An integrated motor and magnetic bearing consistent with the invention comprises a rotor comprising a plurality of permanent magnets and a stator comprising a plurality of independently controlled coil segments magnetically coupled to the permanent magnets. Embodiments may further comprise first and second radial position sensors, the first radial position sensor disposed in or adjacent to a clearance gap between the rotor and the stator for sensing the position of the rotor with respect to the stator along a first axis, and a second radial position sensor disposed in or adjacent to the clearance gap between the rotor and the stator for sensing the position of the rotor with respect to the stator along a second axis. In method form, a method for providing integral electromagnetic motor and bearing functions comprises sensing a first radial position of a rotor, the rotor comprising a plurality of permanent magnets, with respect to a stator along a first axis, the stator comprising a plurality of independently controlled coil segments magnetically coupled to the permanent magnets; and sensing a second radial position of the rotor with respect to the stator along a second axis; and delivering current to at least one coil segment, the amount of current based on at least one sensed position.

23 Claims, 6 Drawing Sheets

| X - OR Y - DIRECTION OF FORCE | | | | RESULTANT | | |
|---|---|---|---|---|---|---|
| F1 | F2 | F3 | F4 | Fx | Fy | TORQUE |
| + | 0 | 0 | 0 | + | 0 | + |
| + | 0 | + | 0 | + + | 0 | 0 |
| + | 0 | - | 0 | 0 | 0 | + + |
| - | 0 | 0 | 0 | - | 0 | - |
| - | 0 | - | 0 | - | 0 | 0 |
| - | 0 | + | 0 | 0 | 0 | - |
| + | + | - | - | 0 | 0 | + + + + |

FIG. 6

INTEGRATED MAGNETIC BEARING

This application claims the benefit of U.S. provisional application serial No. 60/248,464 filed on Nov. 14, 2000, entitled "Integrated Magnetic Bearing".

BACKGROUND OF THE INVENTION

1. Field of the Invention

The present invention relates generally to a rotational magnetic gimbal with an integral magnetic bearing. More particularly, the present invention relates to brushless DC motor technology that provides electromagnetic suspension, using a single electromagnetic actuator to perform both the bearing and rotary torque (motoring) functions.

2. Description of Related Art

Current rotational electric motors employ mechanical bearings in their ends or on the apparatus to which they are providing torque. Recent research in the area of combination motor-bearings has yielded working prototypes of both AC and DC machines. Although some AC machines can provide rotational positioning, more commonly these machines find application where a constant rotating speed is required in spite of load variations. The primary benefit is the potential for high power density and high-speed machines due to the smaller size (length/volume) of combination motor-bearings. Prototypes of AC type motor-bearings have matured to the point of finding applications in a bearingless blood pump and industrial roll.

Figure 1A:
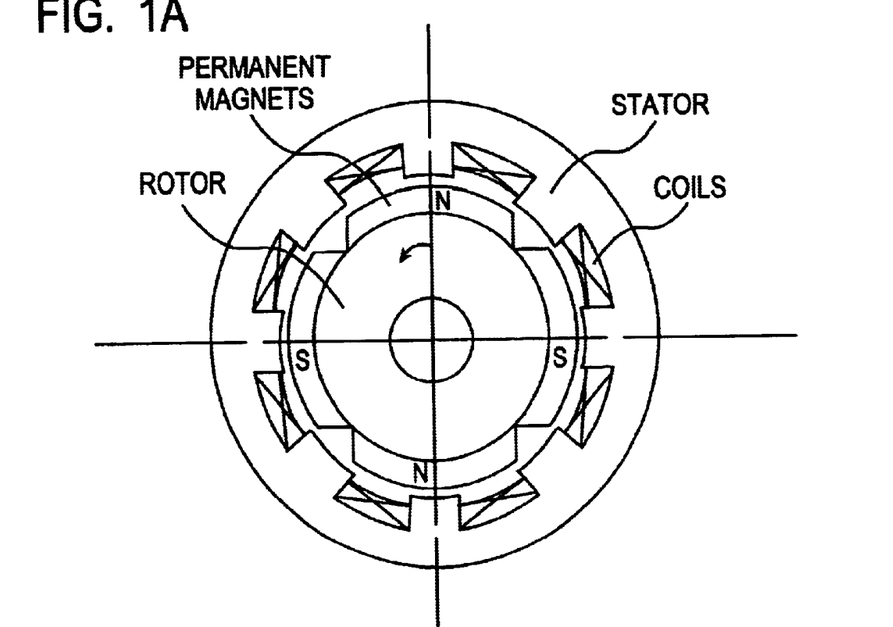
FIG. 1A depicts a conventional brushless DC motor with magnetic bearing components.
Figure 1B:
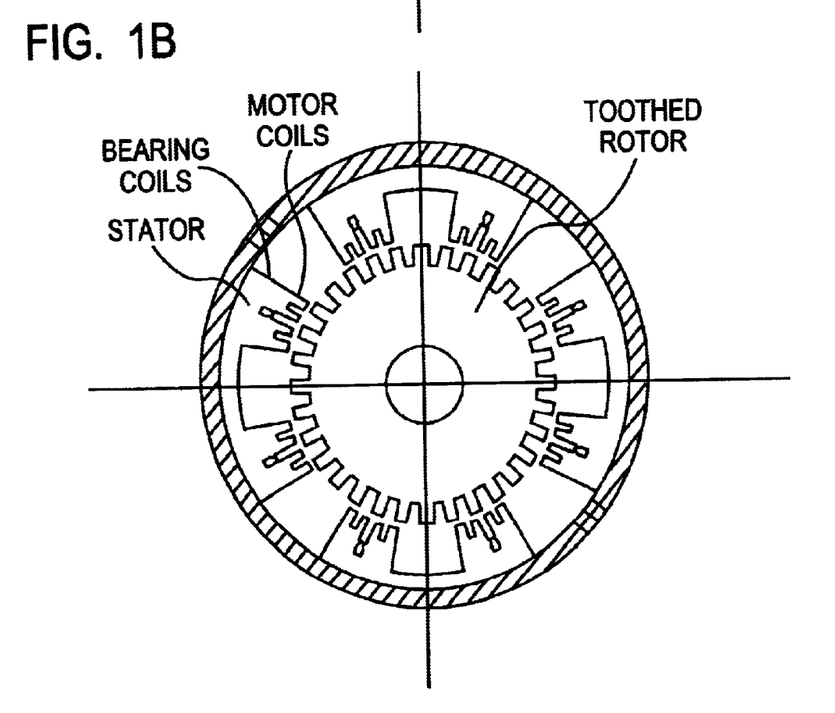
FIG. 1B depicts a conventional reluctance motor with magnetic bearing components.

Of more relevance to high accuracy pointing devices are combination motor-bearings of the DC type, which can provide relatively high torque and levitation forces at zero and low rotational speed. Furthermore, pure magnetic bearings are DC machines, for which a wealth of vibration isolation control algorithms and hardware has been developed. FIGS. 1A and 1B illustrate the present state-of-the-art in design of DC combination motor-bearings.

FIG. 1A shows a brushless permanent magnet (PM) design where the commutation action for motoring is performed using an angular position sensor and digital control logic (not shown), and levitation is performed using radial position sensors and digital control logic (not shown). This design uses PM's mounted on the surface of the rotor as field poles, and common armature coils for motoring and suspension in the stator. Alternatively, the PM's can be embedded in the rotor iron to achieve a stronger levitation force than the surface PM design. FIG. 1B shows a reluctance (stepper) motor design that uses a cylindrical, toothed rotor and separate armature coils for motoring and levitation on the stator. The advantage of the stepper motor design is that no angular position sensor is necessarily required. However, in very fine pointing applications, such a sensor may be desirable to overcome torque ripple and cogging common to stepper motor technology. Note that each of these designs is toothed, which creates unwanted detent torque within the actuator and makes accurate pointing more difficult. Evaluation of toothless actuators has been extensively considered by Airex Corporation to eliminate cogging torque and increase peak torque and pointing accuracy for these applications.

While both of the designs shown in FIG. 1A and FIG. 1B offer control of only two translational and one rotational degrees-of-freedom, the principle of operation can be extended to three translational and two rotational degrees-of-freedom.

The most significant design issues for both AC and DC combination motor-bearings are reducing the detrimental effects of magnetic flux cross coupling upon the motoring and bearing control actions, and achieving target force and torque specifications. The main benefit of using combination motor-bearings is reduced size and weight, which follows from common armature coils and flux paths (iron) being used for generation of both motor torque and bearing force. This design efficiency, however, creates potential for significant cross coupling effects that must be carefully treated. The use of common flux paths for motoring and bearing functions must also be carefully designed with regard to maximum torque and force generation capability. Since the maximum flux in a path at any instant is limited by material saturation, the maximum achievable force and torque trade-off against each other during operation. This tradeoff must be considered during the design stage for successful application of the technology.

SUMMARY OF THE INVENTION

The present invention provides a rotational magnetic gimbal with an integral magnetic bearing. Brushless DC motor technology provides electromagnetic suspension, using a single electromagnetic actuator to perform both the radial bearing and rotary torque (motoring) functions.

An integrated motor and magnetic bearing consistent with the invention comprises a rotor comprising a plurality of permanent magnets and a stator comprising a plurality of independently controlled coil segments (or sets) magnetically coupled to the permanent magnets, the coil segments comprising a plurality of coil phases. An integrated motor and magnetic bearing may further comprise a first and second radial position sensors, the first radial position sensor disposed in or adjacent to a clearance gap between the rotor and the stator for sensing the position of the rotor with respect to the stator along a first axis, and a second radial position sensor disposed in or adjacent to the clearance gap between the rotor and the stator for sensing the position of the rotor with respect to the stator along a second axis. An integrated motor and magnetic bearing consistent with the invention is capable of providing simultaneously both rotational torque and radial bearing force.

In method form, a method for providing integral electromagnetic motor and bearing functions comprises sensing a first radial position of a rotor, the rotor comprising a plurality of permanent magnets, with respect to a stator along a first axis, the stator comprising a plurality of independently controlled coil segments magnetically coupled to the permanent magnets; and sensing a second radial position of the rotor with respect to the stator along a second axis; and delivering current to at least one coil segment, the amount of current based on at least one sensed position.

DETAILED DESCRIPTION OF EXEMPLARY EMBODIMENTS

Figure 2:
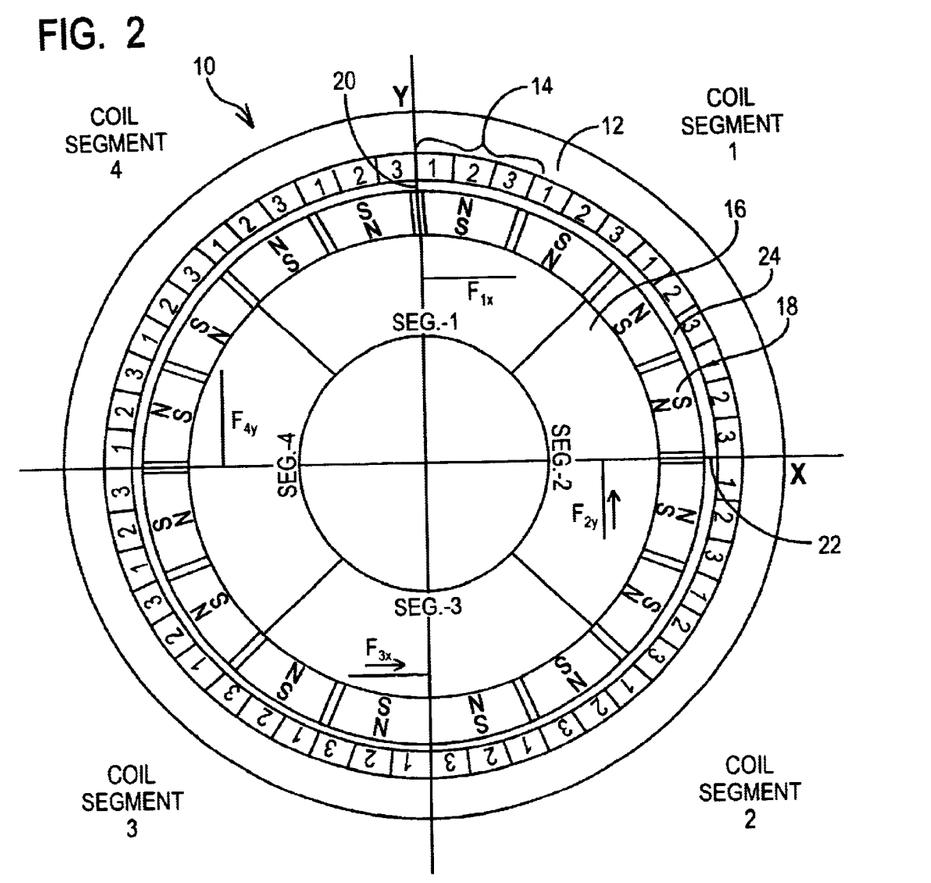
FIG. 2 depicts an integrated magnetic bearing and toothless DC brushless motor according to one exemplary embodiment of the present invention.

FIG. 2 depicts an integrated magnetic bearing and toothless DC brushless motor 10 according to one exemplary embodiment of the present invention. In the present exemplary embodiment, the integrated motor 10 includes a generally circular stator 12 that includes a plurality of coil phases 14 arranged around the inner periphery of the stator. Depicted in FIG. 2 is a plurality of coil segments, each containing coils, wherein each coil segment comprises any number of phases (at least two), and the exemplary arrangement illustrated is a three-phase arrangement, i.e., phase 1, 2 and 3. The present invention equally contemplates other phase numbers, and should be generally and broadly construed as any polyphase coil arrangement. The motor also includes a rotor 16 that has a plurality of permanent magnets 18 placed along the outer periphery of the rotor, and magnetic coupled to the coils. The magnets are magnetized in alternating north and south polarity in the radial direction. A clearance gap 24, or air gap, is provided between the rotor and the stator, which may be sized in proportion to the vibration isolation requirement (e.g., a 0.020" gap has been demonstrated in conjunction with an 8" diameter rotor coupled with an 11" (OD) diameter stator).

The motor 10 also includes radial position sensors 20 and 22 (not shown) disposed in or adjacent to the clearance gap 24 between the stator 12 and rotor 16. The position sensors 20 and 22 (or "gap sensors") detect the relative position of the stator with respect to the rotor along the Y-axis and X-axis, respectively. The particular position sensor utilized is not important to understanding the present invention and may comprise optical probes, and/or hysteresis probes, and/or capacitive sensors, and/or scale encoders, and/or proximity sensors, and/or other position sensors known in the art. Each position sensor generates a signal proportional to the radial position of the rotor with respect to the stator along the x- and y-axes, by measuring the width of the gap 24 therebetween.

Figure 2A:
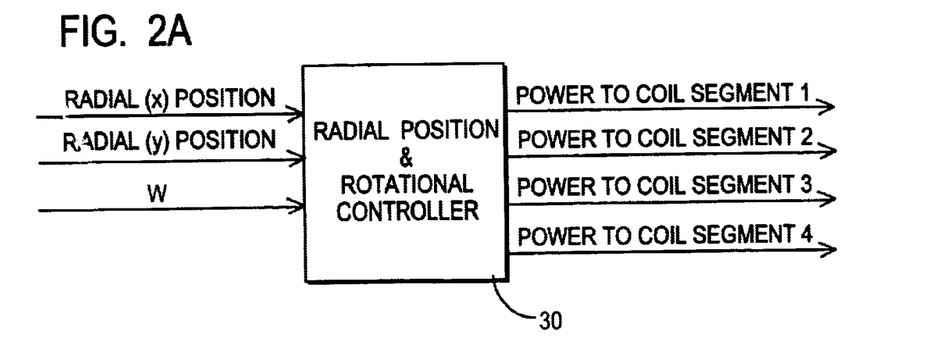
FIG. 2A depicts a controller for integrated magnetic bearing and motor of FIG. 2.

Advantageously, the present invention logically segments the motor 10 into four separate equal-length coil segments, labeled Coil Segments 1, 2, 3 and 4. In the present invention, torque is applied to each of the coil segments independently (or to groups of coil segments, e.g, as in three-phase motors) to achieve both a desired rotational speed (w) and a desired radial position. FIG. 2A depicts a generic controller 30 that is adapted to receive rotational and radial position feedback data and generate independent power signals to each of the segments of the motor. FIG. 2 illustrates how independent torque and bearing forces are generated using four separately controlled arced segments. By controlling the current in each segment, the bearing forces in both the x-direction and the y-direction can be controlled for each segment and summed to get the total forces in the x- and y-direction. With position sensors and controls (not shown), this will allow the system to stabilize the shaft within the radial clearance gap as well as feature vibration isolation and cancellation.

Figure 3:
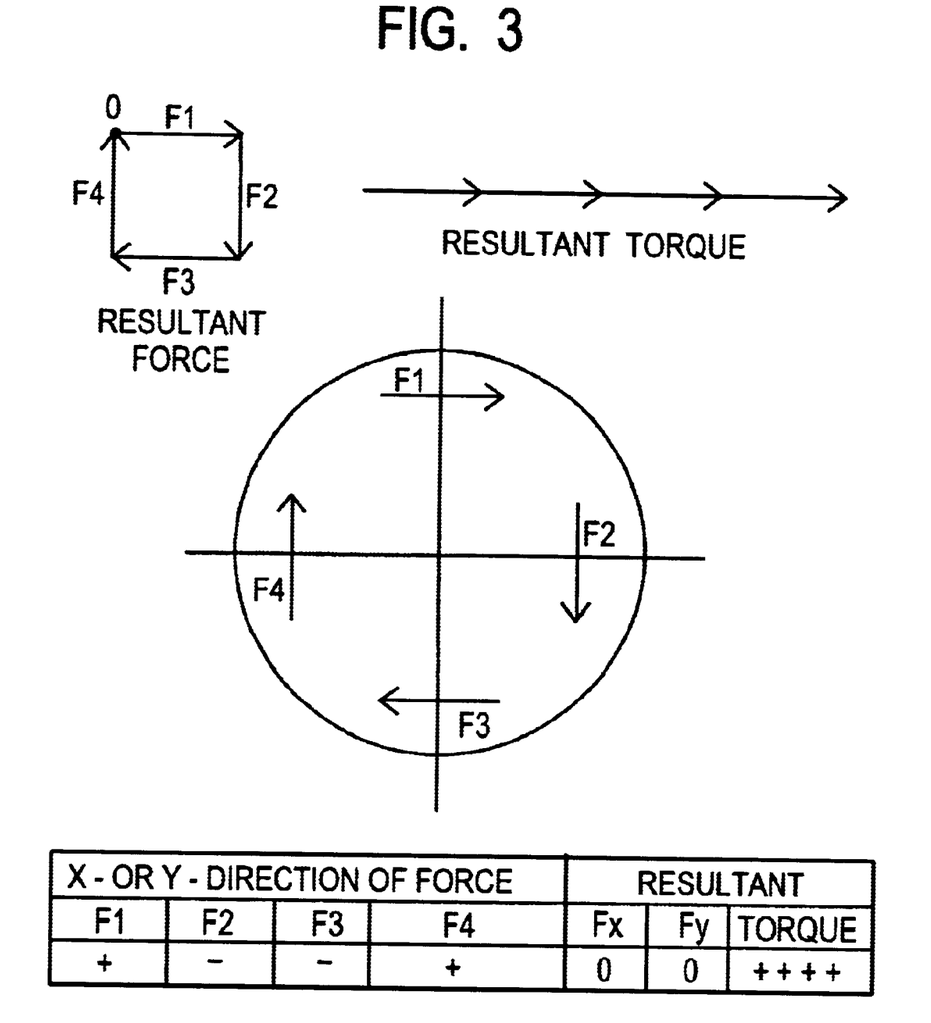
FIG. 3 depicts one exemplary vector relationship between force (current) direction in each segment versus the resulting forces and torque of the integrated magnetic bearing and motor of FIG. 2.

FIG. 3 illustrates the vector relationship between force (current) direction in each segment versus the resulting forces and torque. In practice, the phase relationship and size of the current in each phase can be of smoothly varying value; however, in this example, all forces have the same absolute value of one unit. F1 and F3 cancel each other out in the x-direction and F2 and F4 cancel each other out in the y-direction. By adding the vectors together, it is apparent that the resultant force is equal to zero. There will be no resultant force in the x- or the y-direction. Each force does produce a rotational torque, however. For each segment, torque is the tangential component of the force value multiplied by the radius. With a clockwise rotation assumed to be in the positive direction, it can be seen that all forces in this case produce a positive torque. Assuming that all the radii are the same and that all forces are tangential, the resultant torque is obtained by adding the force values together and multiplying by the common radius.

Figure 4:
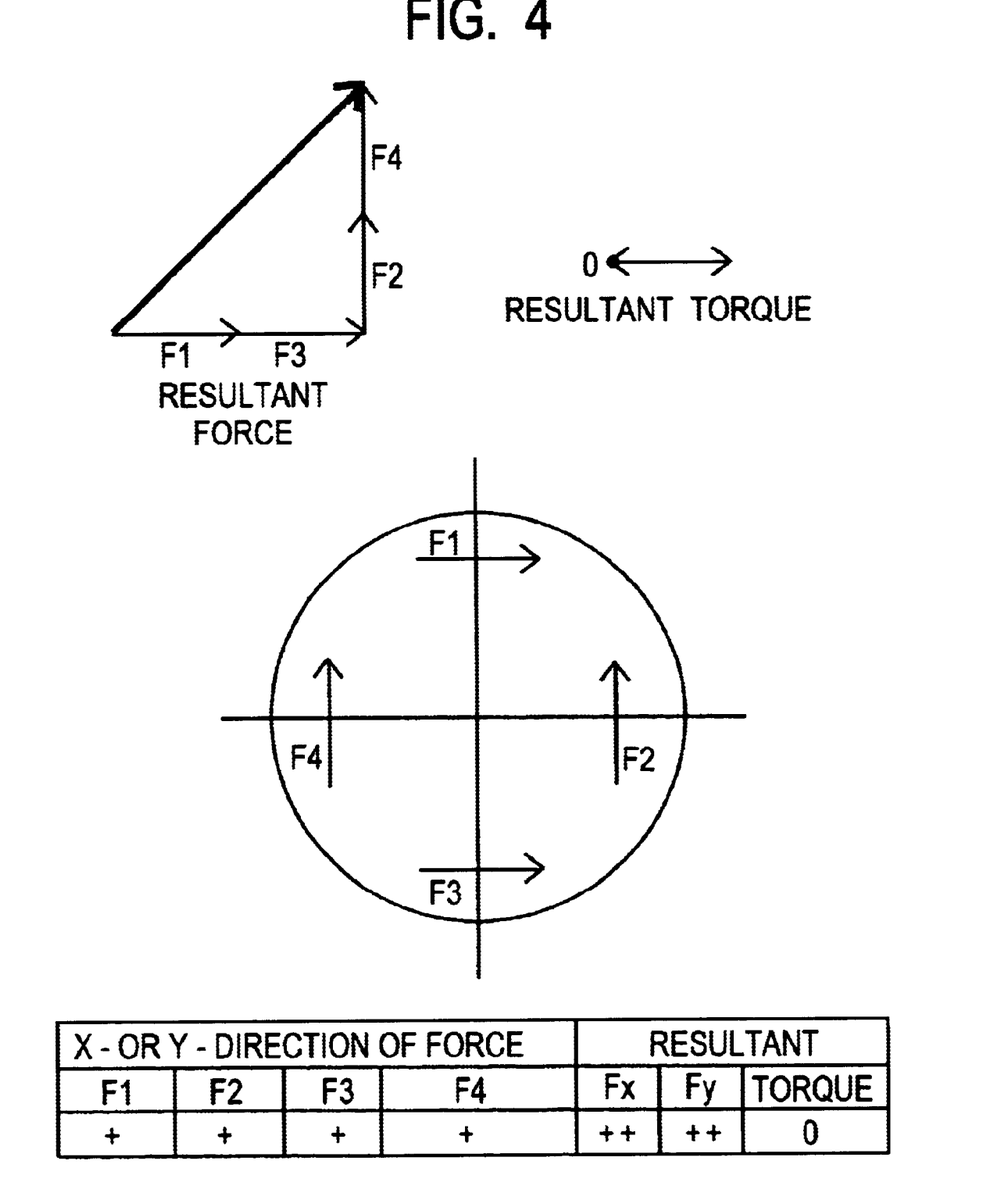
FIG. 4 depicts another exemplary vector relationship between force (current) direction in each segment versus the resulting forces and torque of the integrated magnetic bearing and motor of FIG. 2.

FIG. 4 also illustrates the vector relationship between force (current) direction in each segment versus the resulting forces and torque. As in the previous example, all forces have the same absolute value of one unit. F1 and F3 do not cancel each other out in the x-direction nor do F2 and F4 cancel each other out in the y-direction. By adding the vectors together, it is apparent that the resultant force is not equal to zero. There will be a resultant force in the x- and the y-direction. Each force still produces a rotational torque, however. As before, in each segment, torque is the tangential component of the force value multiplied by the radius. With a clockwise rotation assumed to be in the positive direction, it can be seen that not all forces in this case produce a positive torque. Assuming that all the radii are the same and that all forces are tangential, the force values can be added together and multiplied by the common radius to get the resultant torque. Adding the force values together produces a value of zero, which, multiplied by the radius, produces a torque value of zero as well.

Figure 5:
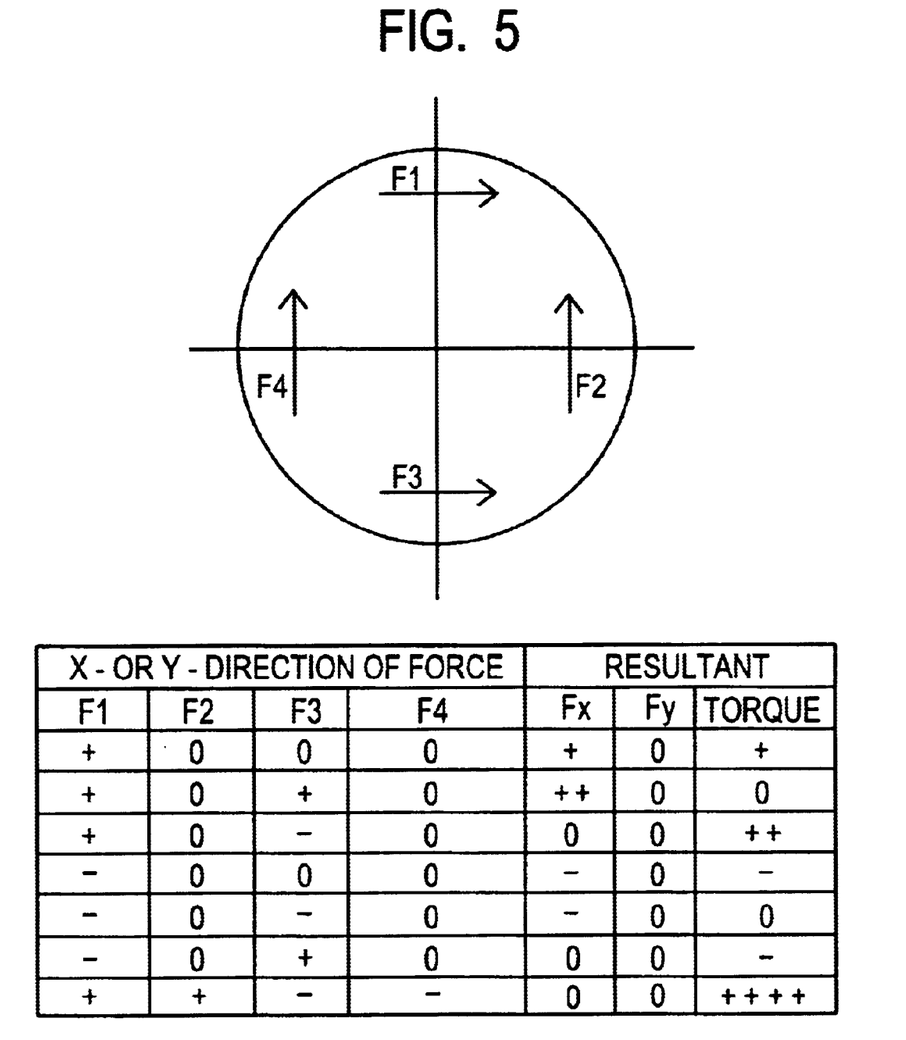
FIG. 5 depicts numerous possible combinations of segment current (force) and torque relationships of the integrated magnetic bearing and motor of FIG. 2.

FIG. 5 shows several other possible combinations of segment current (force) and torque relationships. Note that in all cases, each "+" sign or "−" sign represents a force with a magnitude of one unit or a torque with a magnitude of one unit multiplied by the radius. The sign represents the direction of the force or the torque, not the value. For the examples depicted in FIGS. 3–5, it is understood that the controller of FIG. 2A is adapted with an appropriate control algorithm to achieve desired radial positioning of the rotor with respect to the stator.

Thus, it is evident that an integrated magnetic bearing and motor have been provided. Those skilled in the art will recognize numerous modifications to the present invention. For example, the motor 10 of FIG. 2 is logically segmented into four separate segments as depicted. The present invention can be adapted to any number of segments (e.g., 3 or more). Of course, increasing the number of segments will increase rotational and positioning smoothness and may reduce any cross-coupling effects, but may require more complicated control algorithms. Additional radial position sensors may further be added, as necessary. Those skilled in the art should recognize that the rotor may be configured outside the stator. Thus, the present invention is equally adaptable to such configurations. It should further be noted that, in the exemplary embodiment depicted in FIG. 2, those skilled in the art will recognize that, since this example comprises four coil segments having equal radial length, and the bearing may still be levitated with only three coils, a fourth set (as illustrated and described herein) serves to provide an additional degree of fault tolerance (i.e., if one coil fails, the three others are sufficient to levitate the bearing). It is contemplated that other numbers of coils may be provided in various configurations, and that appropriate sensing and control means are provided in any fault tolerance configuration.

Still other modifications are possible. For example, the bearing arrangement depicted in FIG. 2 may be disposed on either end of a shaft (not shown) and utilized to control pointing of the rotor. In this example, the rotor/stator are embedded into tubular members where each end is independently controlled to position the rotor in a desired skew with respect to the stator. Further, for applications comprising an off-center load, off-axis operation or run-out cancellation may be provided to allow the load to be balanced, i.e., the center line of the rotor can follow a circle as it rotates to center a load on top of the bearing.

Figure 6:
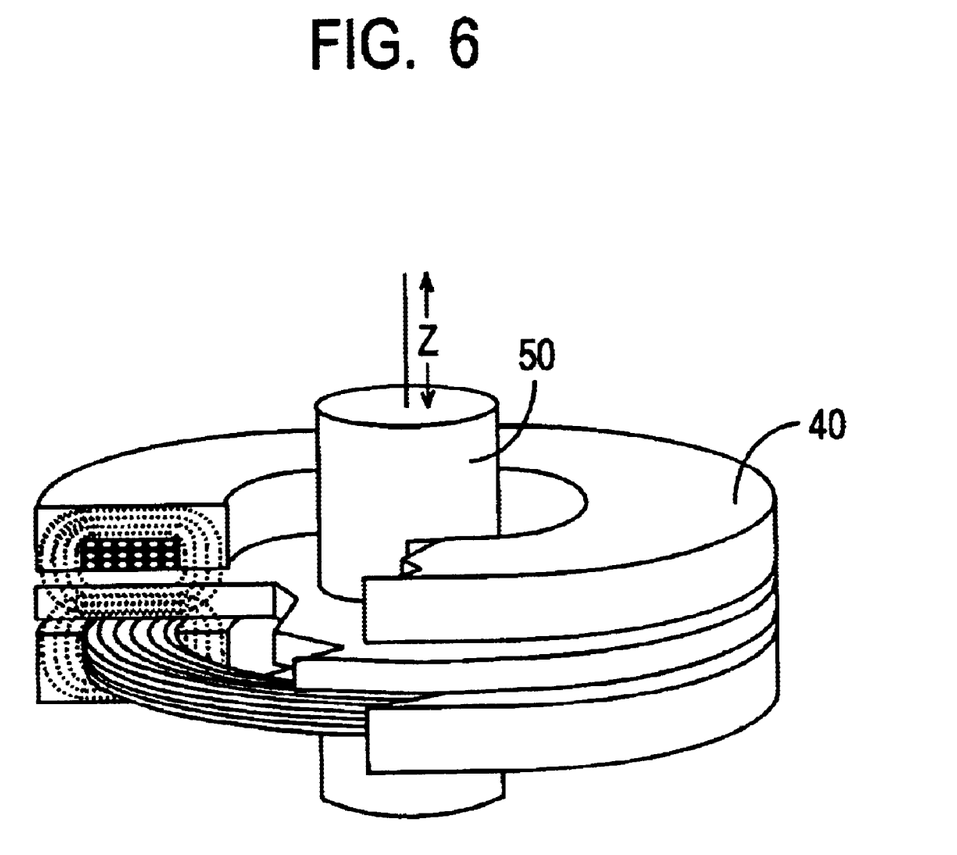
FIG. 6 depicts an exemplary thrust bearing in an exemplary embodiment of the present invention.

As illustrated in FIG. 6, other embodiments might comprise the use of a magnetic thrust bearing 40 (e.g., a Maxwell bearing) along the shaft 50 to produce force in the axial direction, z, and to stabilize the bearing. The thrust bearing and the associated thrust position (or gap) sensors may be incorporated into a motor and magnetic bearing consistent with the invention, or may be attached to such a motor and magnetic bearing. It should also be recognized that assembly of a magnetic bearing results in attraction of the rotor to the stator (which is commonly alleviated using tooling, e.g. lamination materials on the outside of the bearing), and that the flux attraction indicative of this feature will provide a degree of axial thrust that may be sufficient, in certain applications, to eliminate the use of a thrust bearing (e.g., the system would act as though supported by one or more springs).

Those skilled in the art should recognize that in brushless DC motors, a commutation device is required to cause the motor phase currents to be switched appropriately. Three-phase systems using commutation devices comprising Hall effect transistors typically have six "states" in the cycle, and may be the least expensive solution. In a magnetic bearing, however, more effective means of commutating, (e.g., an encoder) are typically used. An encoder can be used as a position sensor, wherein its output provides the phase position. Yet another alternative is sensorless commutation, wherein voltages generated in the device at the windings are measured (e.g., in the brief period during which a control stops driving the current into a coil) and appropriate electronics may be provided to calculate a sensed position based on currents generated in the coils.

Although the present invention has been described with reference to a rotary design integrated magnetic bearing, the present invention applies equally to linear motor designs. For example, the motor 10 of FIG. 2 can easily be formed into a linear design by "unrolling" the stator and rotor. The segmented coil design described herein would apply to such a linear design. These and other examples and modifications will become apparent to those skilled in the art, and all such examples and modifications are deemed within the scope of the present invention, as defined by the appended claims.

We claim:

1. An integrated motor and magnetic bearing, comprising:
   a rotor comprising a plurality of permanent magnets; and
   a stator comprising a plurality of independently controlled coil segments magnetically coupled to said permanent magnets;
   said motor segments adapted to produce tangential forces thereto, thereby producing both torque and bearing forces on said stator and said rotor from said tangential forces.

2. An integrated motor and magnetic bearing as claimed in claim 1, said motor segments comprising a plurality of coil phases.

3. An integrated motor and magnetic bearing as claimed in claim 2, wherein said plurality of coil phases is at least two coil phases.

4. An integrated motor and magnetic bearing as claimed in claim 1, further comprising a first radial position sensor disposed in or adjacent to a clearance gap between said rotor and said stator for sensing the position of said rotor with respect to said stator along a first axis, and a second radial position sensor disposed in or adjacent to said clearance gap between said rotor and said stator for sensing the position of said rotor with respect to said stator along a second axis.

5. An integrated motor and magnetic bearing as claimed in claim 4, further comprising a controller receiving input from at least one said sensor and, based on said at least one input, controlling the current delivered to at least one said coil segment.

6. An integrated motor and magnetic bearing as claimed in claim 5, wherein said controller is adapted to permit off-axis positioning.

7. An integrated motor and magnetic bearing as claimed in claim 1, said integrated motor and magnetic bearing capable of providing simultaneously both rotational torque and bearing force.

8. An integrated motor and magnetic bearing as claimed in claim 4, wherein at least one said sensor is selected from the group consisting of: an encoder, a Hall effect transistor, and a device adapted to measure a voltage generated at least one said coil segment.

9. An integrated motor and magnetic bearing as claimed in claim 1, said integrated motor and magnetic bearing operating as a DC device.

10. An integrated motor and magnetic bearing as claimed in claim 4, wherein said clearance gap is sized so as to provide vibration isolation.

11. An integrated motor and magnetic bearing as claimed in claim 1, wherein at least one said motor segment is provided for fault tolerance.

12. An integrated motor and magnetic bearing as claimed in claim 1, wherein said integrated motor and magnetic bearing is adapted to provide off axis-operation and/or run-out cancellation.

13. An integrated motor and magnetic bearing as claimed in claim 1, wherein said rotor has a toothless configuration.

14. An integrated motor and magnetic bearing as claimed in claim 1, further comprising a thrust bearing adapted to provide axial thrust.

15. An integrated motor and magnetic bearing as claimed in claim 1, wherein said rotor and said stator are configured such that the attraction of said rotor to said stator provides axial thrust.

16. An integrated motor and magnetic bearing as claimed in claim 2, wherein said plurality of motor segments is at least three coil segments.

17. An apparatus for manipulating a shaft comprising:
   two integrated motor and magnetic bearing assemblies, each said assembly comprising a rotor and a stator, each said rotor comprising a plurality of permanent magnets, and each said stator comprising a plurality of independently controlled coil segments magnetically coupled to said permanent magnets, said motor segments adapted to produce tangential forces thereto, thereby producing both torque and bearing forces on said stator and said stator and said rotor from said tangential forces; and
   a shaft;
   wherein each said assembly is disposed along said shaft.

18. An apparatus as claimed in claim 17, further comprising an independent control device for each said assembly, thereby allowing independent movement of the shaft with respect to each said assembly.

19. An apparatus as claimed in claim 18, wherein said control devices are adapted to permit rotation of said shaft off the central axis.

20. An apparatus as claimed in claim 18, wherein at least one said rotor and at least one said stator are configured such that the attraction of said rotor to said stator provides axial thrust.

21. An apparatus as claimed in claim 18, wherein said control devices are adapted to permit warping or off-axis pointing through the axial plane by independent positioning of the suspended shaft in each said assembly.

22. An apparatus as claimed in claim 17, further comprising a thrust bearing adapted to provide axial thrust.

23. A method for providing integral electromagnetic motor and bearing functions comprising:

sensing a first radial position of a rotor, said rotor comprising a plurality of permanent magnets, with respect to a stator along a first axis, said stator comprising a plurality of independently controlled coil segments magnetically coupled to said permanent magnets;

sensing a second radial position of said rotor with respect to said stator along a second axis; and delivering current to at least one said coil segment, the amount of said current based on at least one said sensed position;

producing tangential forces on said motor segments; and producing both torque and bearing forces on said stator and said rotor from said tangential forces.

* * * * *

UNITED STATES PATENT AND TRADEMARK OFFICE
CERTIFICATE OF CORRECTION

PATENT NO. : 6,707,200 B2
DATED : March 16, 2004
INVENTOR(S) : Carroll et al.

It is certified that error appears in the above-identified patent and that said Letters Patent is hereby corrected as shown below:

Column 5,
Line 62, after "controlled" delete "coil" and insert -- motor --.

Column 6,
Line 59, after "controlled" delete "coil" and insert -- motor --.
Line 63, after "stator" delete "and said stator".

Signed and Sealed this

Twenty-second Day of February, 2005

JON W. DUDAS
*Director of the United States Patent and Trademark Office*